June 8, 1954
J. J. L. STAPELBERG
2,680,754
SOLVENT EXTRACTION OF OILS, FATS, AND
WAXES FROM PARTICLES OF SOLID MATTER
Filed Oct. 3, 1950
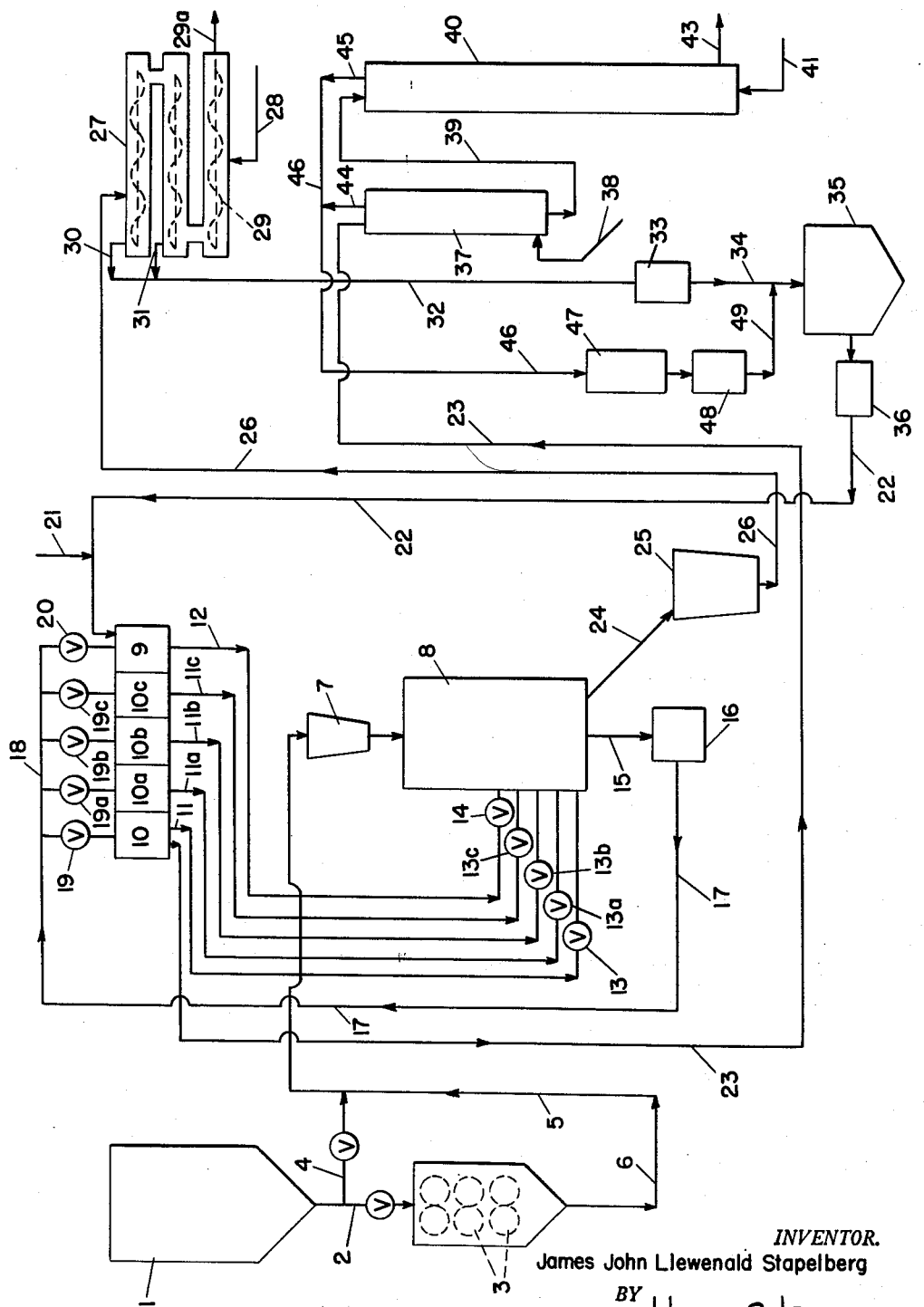
INVENTOR.
James John Llewenald Stapelberg
BY Hugo G. Kemman
Attorney Patented June 8, 1954

2,680,754

UNITED STATES PATENT OFFICE 2,680,754

SOLVENT EXTRACTION OF OILS, FATS, AND WAXES FROM PARTICLES OF SOLID MATTER

James John Llewenald Stapelberg, Malvern, Johannesburg, Transvaal, Union of South Africa, assignor to Tiger Oats & National Milling Company, Limited, Newtown, Johannesburg, Transvaal, Union of South Africa, a company of the Union of South Africa Application October 3, 1950, Serial No. 188,248

Claims priority, application Union of South Africa September 21, 1949

15 Claims. (Cl. 260—412.4)

The present invention relates to a new and improved process for the extraction of extractable matter, such as oils, fats and waxes, from solids capable of extraction which are of vegetable or animal or marine origin, by means of an organic solvent for the said matter, and to apparatus for carrying out the said new process.

Up to the present it has been conventional, insofar as I am aware, to treat such solids with a solvent in an extractor, in which the solid is at rest or agitated in a bath of solvent, or in which the solvent is caused to percolate through one or more beds or layers of solid capable of extraction. Where suitable, such solids may be first subjected to an expeller treatment. The miscellae obtained in practice, according to previous methods, are usually rather dilute, and in order to recover the extracted matter and the solvent therefrom, they are first concentrated in a series of pre-evaporators, usually operated at atmospheric pressure and indirectly heated by steam coils, and the rest of the solvent is then removed from the concentrate in an evaporator and a stripper operated under reduced pressure and with direct injection of steam.

I have now found that the extraction of extractable matter, such as oils, fats and waxes, from solids capable of extraction which are of vegetable or animal or marine origin (biological class), by means of an organic solvent is greatly improved by operating in accordance with my invention, in which a solvent to solute ratio by volume of not substantially greater than 1.5 to 1 is employed, excluding from such ratio that solvent which is retained by the exhausted meal upon separation of miscella therefrom.

Preferably, centrifugal force is applied throughout the duration of the extraction for passage of the solvent liquid (including miscella) through the solids, e. g. in the form of a bed inside a revolving perforated basket. However, broadly speaking, the bed of solids may be disposed in any other manner which includes a stationary bed, and, if desired, any means known in the art may be employed to assist the flow of the solvent liquid through the bed, or to separate the solvent from the bed.

Solvent extraction, in accordance with the present invention, may have one or more of the following advantages, as against previous methods:

(a) A more concentrated miscella is obtained direct. Thus, a miscella obtained direct in the solvent extraction of soy bean meal, according to previous methods, contains only between approximately 14 and 22 per cent of oil by volume, (between approximately 19 and 28 per cent of oil by weight when using hexane as solvent), whereas in the process, according to the present invention, a concentrated miscella is obtained direct, which is withal more suitable for stripping, and which usually contains approximately 40 to 50 per cent or more of oil by volume, (about 50 to 60 per cent or more of oil by weight when using hexane as solvent).

The advantages obtainable with a more concentrated miscella are:

I. That the miscella can be stripped direct, e. g. in a tower type of evaporator, or after only little pre-evaporation treatment. Consequently no or only a small investment for pre-evaporators is required.

II. That owing to the reduction of the extent of the pre-evaporator treatment or its elimination, the extracted matter undergoes less heat-treatment and therefore suffers no deterioration or less than hitherto. This is important as regards its color and/or keeping qualities.

III. An economy in energy for the removal of solvent from the miscella is attained.

(b) A smaller solvent-oil ratio is required, and in consequence solvent losses and the costs for solvent recovery are reduced. For example, in an efficient soy bean solvent extraction plant, as hitherto employed, the solvent-oil ratio is approximately 4:1 by volume. When working according to the present invention, the solvent-oil ratio is 1.5:1 by volume or better, whilst the degree of extraction is the same or better.

(c) The miscella is frequently more thoroughly removed from the extracted solid. Thus a soybean meal, which has been extracted, in accordance with the present invention, may contain only about 5 to 15 per cent by weight of solvent for recovery, and rarely more than 15 per cent, whereas according to the methods previously practiced, it frequently contains about 30 to 35 per cent of solvent for recovery.

Therefore by the present invention, the recovery of solvent from the residue is simplified, as fewer or simpler driers are required, and the corresponding outlay is reduced.

(d) Extractable matter can be extracted from solids of a type, which could not be extracted economically, according to previous solvent extraction methods, for example from South African maize germ meal.

(e) If a higher degree of extraction is desired than that normally attained in certain conventional solvent extraction processes, this can easily be arranged according to the present invention by simply giving one or more additional solvent treatments in the centrifuge without increase of the solvent-oil ratio. To attain comparable results, according to these conventional methods, inter alia, the solvent-oil ratio must be greatly increased, or the entire process must be repeated.

(f) Pretreatment of the initial solids is in certain cases eliminated or simplified.

I. For example, in certain conventional plants, flaking is regarded as a more or less essential pretreatment. According to the present invention, flaking has shown no appreciable advantage in the case of ground expeller oil cakes, inter alia, although in certain cases, such as with cottonseed, flaking or pulverizing is advantageous.

II. In certain conventional plants, conditioning of the initial material as regards moisture content, for example, in soy bean extraction has been found most important. In accordance with the present invention, conditioning as regards moisture content can frequently be dispensed with, if desired.

As shown above, many of the problems besetting experts in solvent extraction, according to the methods and means hitherto employed, have been overcome by the present invention.

Extraction, in accordance with the invention, is preferably carried out in a basket centrifuge.

Usually the solvent or miscella is sprayed on to the solid to be extracted in the centrifuge. It may be desirable, previously to moisten the solid with solvent or miscella, or to mix it therewith for transport into the centrifuge. Again the solid may be mixed with the requisite amount of solvent or miscella from the beginning and centrifuged.

Advantageously the organic solvent or miscella is pumped around in a closed circuit for extraction of the solid in the centrifuge. This new principle may find general application in the centrifugal treatment of solids with liquids.

It will usually be desirable to subject a given charge of solid to successive extractions with miscellae from earlier extractions, having successively decreasing concentrations and finally with clean solvent. Separate containers may be provided for fresh solvent and for separately collected miscellae of various concentrations from various stages of extraction.

A preferred method is to charge a single centrifuge or a battery of centrifuges with fresh solid to be extracted, and to treat it successively with different miscellae, each being more dilute than that preceding it until finally clean solvent is passed through the solid to be extracted. The miscella employed for the initial treatment of fresh solid conveniently may be the most concentrated, or next most concentrated, miscella from an earlier operation on solid material from the same or a similar source. Cocks are provided to switch over to the supplies of miscellae of different concentration and of clean solvent. Other cocks are provided adapted to switch over the effluent from the centrifuges to ducts leading to the containers for miscellae of corresponding concentration. The time of switch-over of the cocks for the effluent is preferably correlated to the time of switch-over of the corresponding cocks for the feed of miscella. The control of the cocks may be effected automatically.

Again, a series of centrifuges may be employed in the first of which fresh solid is extracted with the most concentrated miscella or next most concentrated miscella from an earlier operation, whereas in the last the most impoverished residue is treated with fresh solvent, and so on through the series according to the counter-current principle.

Miscella is used for extraction until a concentrated miscella is obtained, preferably suitable for direct stripping. The concentrated miscellae contain e. g. about 40 to 50 per cent by volume or more of oil.

The size and speed of the centrifuge, and therewith the amount of centrifugal force employed, are selected according to circumstances. The amount of centrifugal force should be sufficient to leave only a small amount of miscella, say between 10 and 20 per cent by weight, or even between 5 and 10 per cent or less, in the residue.

The process is particularly adapted for the solvent extraction of oils and/or fats, hereinafter referred to as "oleaginous matter" from vegetable matter containing the same, such as maize germs, mielie (maize) germ meal, maize (corn), cotton seed, soya bean, peanut, sesame seed, rape seed, cocoanut meat, linseed, ground nuts, sunflower seed, palm kernels, copra and oil cakes therefrom, or from animal or marine matter, such as from whale, fish and/or parts thereof, suet, hides, or bones from land animals, etc.

Any organic solvents with the desired extraction properties and having a boiling range allowing of their easy recovery may be employed. Examples of these are solvent naphtha, petroleum naphtha, n-hexane, n-heptane, mixed octanes, tri-chlorethylene, ethylene dichloride, methyl chloride, carbon disulphide, acetone and ethyl ether, or mixtures thereof.

If desired provision may be made for raising the temperature of the material in the centrifuge, e. g. by injecting steam, or hot solvent vapor, e. g. that produced during solvent recovery, into the centrifuge, or by indirectly heating as with steam, and/or by preheating the solid and/or solvent prior to its introduction into the centrifuge.

If the solid is not in a form suitable for extraction, it is comminuted or subjected to some other preparatory treatment, e. g. grinding or in some cases flaking, cooking, etc.

It is preferred that sufficient fibrous material of a character which will facilitate separation of miscella from residue be present. If this is not naturally present in the solid to be extracted, such fibrous material may be admixed therewith, if desired, e. g. in the form of bran, husks, chaff, straw, asbestos and the like. If desired two concentric centrifuge baskets may be provided, and the said fibrous material filled into the space therebetween to form a jacket of filter material. Alternatively a filter cloth or filter paper may be arranged to line the centrifuge baskets.

An interesting application of the invention in practice is the extraction of maize oil from mielie (maize) germ meal. This meal is a by-product of milling of maize for the production of samp (hulled Indian corn), and usually contains about 10 to 14 per cent of oil by weight, say about 12 per cent on an average. It was hitherto not considered economic to extract oil from this material, as the material is too poor in oil and too inconvenient to process according to conventional methods because of the high content of fines. For the production of maize oil, maize germs as pure as possible were hitherto taken as the initial material.

It was therefore surprising that by treating mielie (maize) germ meal, containing 13.3 per cent by weight of oil in various batches in basket centrifuges with miscellae, obtained in previous extractions, of step-wise decreasing concentration of extracted oil dissolved in n-hexane, and finally with clean n-hexane, on an average with an over-all of 30 to 35 per cent by weight of n-hexane calculated on mielie germ meal, about 12.5 per cent by weight of maize oil was extracted. Further a residue containing only 0.8 per cent by weight of oil and substantially all of the original protein, admirably suitable as an animal feed, e. g. as a pig feed, was obtained.

The residue contained less than 20 per cent by weight of solvent, which was recoverable with little expenditure of heat. The miscella obtained direct by extraction contained approximately 50 per cent by volume of maize oil, from which the solvent was recoverable direct in a stripper, without having recourse to evaporators.

Like results are obtained with soy bean meal.

The following numbered examples are by way of illustration and not of limitation, since the general principles are applicable to the various solids to be extracted and solvents employed in my process.

*Example I*

10 pounds of corn germ meal are treated in a five-stage extraction with normal hexane as follows. The corn germ meal is placed in a perforated centrifuge basket operating at a centrifugal force of 1500 times gravity, and is sprayed with 3.5 pounds of miscella having a concentration of 33 per cent oil by weight in normal hexane, said miscella being that obtained in the second stage treatment of a previous similar extraction of corn germ meal from the same source. The original corn germ meal contained 12 per cent by weight, i. e. 1.2 pounds of oil. The treatment in this first stage is continued by recycling of miscella, if necessary, through the meal in the centrifuge basket, until the concentration of oil in the miscella is raised to at least 50 per cent by weight. After final separation of this cencentrated miscella from the corn germ meal, the meal is similarly contacted in a second stage treatment with 3 pounds of miscella, this miscella being that obtained from the third stage treatment of said previous extraction, and having an oil concentration of 19.4 per cent by weight. This second stage treatment is continued, if necessary, until the concentration of the oil in the miscella is raised to 33 per cent by weight. After final separation of the latter miscella from the corn germ meal, the meal is similarly contacted in a third stage treatment with 2.7 pounds of miscella, this miscella being that obtained from the fourth stage treatment of said previous extraction, and having an oil concentration of 9.6 per cent by weight. This third stage treatment is continued, if necessary, until the oil concentration of the miscella is raised to 19.4 per cent by weight. After final separation of the latter miscella from the corn germ meal, the meal is similarly contacted in a fourth stage treatment with 2.4 pounds of miscella, this miscella being that obtained from the fifth stage treatment of said previous extraction and having an oil concentration of 3.4 per cent by weight. This fourth stage treatment is continued, if necessary, until the oil concentration of the miscella is raised to 9.6 per cent by weight. After final separation of the latter miscella from the corn germ meal, the meal is similarly contacted in a fifth stage treatment with 2.23 pounds of fresh normal hexane, and this fifth stage treatment is continued, if necessary, until a miscella having an oil concentration of 3.4 per cent by weight is obtained.

As above pointed out, the above-mentioned fresh meal fed to the process contained 1.2 pounds of oil. In this illustrative example, the meal after the first stage treatment still contains 1.2 pounds of oil, and also contains 1.2 pounds of hexane. The meal after the second stage treatment contains .63 pound of oil and 1.3 pounds of hexane. The meal after the third stage treatment contains .3 pound of oil and 1.25 pounds of hexane. The meal after the fourth stage treatment contains .12 pound of oil and 1.15 pounds of hexane. The final exhausted meal from the fifth stage treatment contains only 0.037 pound of oil, and 1.06 pounds of hexane.

The foregoing illustrative extraction is the result of feeding 10 pounds of fresh meal to the first stage, 2.23 pounds of fresh normal hexane to the fifth stage, and advancing by one stage each of the respective miscellae of a similar previous extraction, with the miscella from the first stage of said previous extraction going to solvent recovery. Of the 2.23 pounds of fresh hexane fed to the fifth stage, the equivalent of 1.06 pounds of this hexane is left in the spent meal, leaving 1.17 pounds of hexane (neglecting unavoidable losses) which hexane finally leaves the process in the highest concentrated miscella as the result of the fourth subsequent extraction. Thus the solvent to oil ratio is 1.17 to 1.2 by weight, or substantially 1:1 by weight. The volume ratio of solvent to oil is approximately 1.33 to 1.

*Example II*

10 pounds of soya bean meal are treated in a four-stage extraction with normal hexane as follows: The soya bean meal is placed in a perforated centrifuge basket operating at a centrifugal force of 1500 times gravity, and is sprayed with 4.6 pounds of miscella having a concentration of 28 per cent oil by weight in normal hexane, said miscella being that obtained in the second stage treatment of a previous similar extraction of soya bean meal from the same source. The original soya bean meal contained 20 per cent by weight, i. e. 2.0 pounds of oil. The treatment in this first stage is continued by recycling of miscella, if necessary, through the meal in the centrifuge basket, until the concentration of oil in the miscella is raised to at least 50 per cent by weight. After final separation of this concentrated miscella from the soya bean meal, the meal is similarly contacted in a second stage treatment with 4 pounds of miscella, this miscella being that obtained from the third stage treatment of said previous extraction, and having an oil concentration of 14 per cent by weight. This second stage treatment is continued, if necessary, until the concentration of the oil in the miscella is raised to 28 per cent by weight. After final separation of the latter miscella from the soya bean meal, the meal is similarly contacted in a third stage treatment with 3.7 pounds of miscella, this miscella being that obtained from the fourth stage treatment of said previous extraction, and having an oil concentration of 5 per cent by weight. This third stage treatment is continued, if necessary, until the oil concentration of the miscella is raised to 14 per cent by weight. After final separation of the latter miscella from the soya bean meal, the meal is similarly contacted in a fourth stage treatment with 3.34 pounds of fresh normal hexane, and this fourth stage treatment is continued, if necessary, until a miscella having an oil concentration of 5 per cent by weight is obtained.

As above pointed out, the above-mentioned fresh meal fed to the process contained 2 pounds of oil. In this illustrative example, the meal after the first stage treatment contains 1.4 pounds of oil, and also contains 1.4 pounds of hexane. The meal after the second stage treatment contains .59 pound of oil and 1.5 pounds of hexane. The meal after the third stage treatment contains .24 pound of oil and 1.5 pounds of hexane. The final exhausted meal from the fourth stage treatment contains only 0.07 pound of oil, and 1.37 pounds of hexane.

The foregoing illustrative extraction is the result of feeding 10 pounds of fresh meal to the first stage, 3.34 pounds of fresh normal hexane to the fourth stage, and advancing by one stage each of the respective miscellae of a similar previous extraction, with the miscella from the first stage of said previous extraction going to solvent recovery. Of the 3.34 pounds of fresh hexane fed to the fourth stage, the equivalent of 1.37 pounds of this hexane is left in the spent meal, leaving 1.97 pounds of hexane (neglecting unavoidable losses) which hexane finally leaves the system in the highest concentrated miscella as the result of the third subsequent extraction. Thus the solvent to oil ratio is 1.97 to 2.0 by weight, or substantially 1:1 by weight. The volume ratio of solvent to oil is approximately 1.37 to 1.

Example III 10 pounds of cotton seed meal are treated in a four-stage extraction with normal hexane as follows: The cotton seed meal is placed in a perforated centrifuge basket operating at a centrifugal force of 1500 times gravity, and is sprayed with 5.7 pounds of miscella having a concentration of 23.5 oil by weight in normal hexane, said miscella being that obtained in the second stage treatment of a previous similar extraction of cotton seed meal from the same source. The original cotton seed meal contained 30 per cent by weight, i. e. 3.0 pounds of oil. The treatment in this first stage is continued by recycling of miscella, if necessary, through the meal in the centrifuge basket, until the concentration of oil in the miscella is raised to at least 50 per cent by weight. After final separation of this concentrated miscella from the cotton seed meal, the meal is similarly contacted in a second stage treatment with 5.7 pounds of miscella, this miscella being that obtained from the third stage treatment of said previous extraction, and having an oil concentration of 11.9 per cent by weight. This second stage treatment is continued, if necessary, until the concentration of the oil in the miscella is raised to 23.5 per cent by weight. After final separation of the latter miscella from the cotton seed meal, the meal is similarly contacted in a third stage treatment with 5.5 pounds of miscella, this miscella being that obtained from the fourth stage treatment of said previous extraction, and having an oil concentration of 4 per cent by weight. This third stage treatment is continued, if necessary, until the oil concentration of the miscella is raised to 11.9 per cent by weight. After final separation of the latter miscella from the cotton seed meal, the meal is similarly contacted in a fourth stage treatment with 5.0 pounds of fresh normal hexane, and this fourth stage treatment is continued, if necessary, until a miscella having an oil concentration of 4 per cent by weight is obtained.

As above pointed out, the above-mentioned fresh meal fed to the process contained 3.0 pounds of oil. In this illustrative example, the meal after the first stage treatment contains 1.4 pounds of oil, and also contains 1.4 pounds of hexane. The meal after the second stage treatment contains .73 pound of oil and 2.1 pounds of hexane. The meal after the third stage treatment contains .25 pound of oil and 1.9 pounds of hexane. The final exhausted meal from the fourth stage treatment contains only 0.08 pound of oil, and 2.0 pounds of hexane.

The foregoing illustrative extraction is the result of feeding 10 pounds of fresh meal to the first stage, 5.0 pounds of fresh normal hexane to the fourth stage, and advancing by one stage each of the respective miscellae of a similar previous extraction, with the miscella from the first stage of said previous extraction going to solvent recovery. Of the 5.0 pounds of fresh hexane fed to the fourth stage, the equivalent of 2.0 pounds of this hexane is left in the spent meal, leaving 3.0 pounds of hexane (neglecting unavoidable losses) which hexane finally leaves the system in the highest concentrated miscella as the result of the third subsequent extraction. Thus the solvent to oil ratio is 3.0 to 3.0 by weight or 1:1 by weight. The volume ratio of solvent to oil is approximately 1.38 to 1.

The following example illustrates the use of a heavy solvent. The particular solvent employed, namely, trichlorethylene, has a specific gravity of 1.46, whereas n-hexane, which may be considered to be illustrative of a light solvent, has a specific gravity of 0.66.

Example IV 10 pounds of corn germ meal are treated in a five-stage extraction with trichlorethylene as follows. The corn germ meal is placed in a perforated centrifuge basket operating at a centrifugal force of 1500 times gravity, and is sprayed with 7.6 pounds of miscella having a concentration of 21.4 per cent oil by weight in trichlorethylene, said miscella being that obtained in the second stage treatment of a previous similar extraction of corn germ meal from the same source. The original corn germ meal contained 12 per cent by weight, i. e. 1.2 pounds of oil. The treatment in this first stage is continued by recycling of miscella, if necessary, through the meal in the centrifuge basket, until the concentration of oil in the miscella is raised to at least 32 per cent by weight. After final separation of this concentrated miscella from the corn germ meal, the meal is similarly contacted in a second stage treatment with 6.5 pounds of miscella, this miscella being that obtained from the third stage treatment of said previous extraction, and having an oil concentration of 13.0 per cent by weight. This second stage treatment is continued, if necessary, until the concentration of the oil in the miscella is raised to 21.4 per cent by weight. After final separation of the latter miscella from the corn germ meal, the meal is similarly contacted in a third stage treatment with 5.8 pounds of miscella, this miscella being that obtained from the fourth stage treatment of said previous extraction, and having an oil concentration of 6.7 per cent by weight. This third stage treatment is continued, if necessary, until the oil concentration of the miscella is raised to 13.0 per cent by weight. After final separation of the latter miscella from the corn germ meal, the meal is similarly contacted in a fourth stage treatment with 5.2 pounds of miscella, this miscella being that obtained from the fifth stage treatment of said previous extraction and having an oil concentration of 2.7 per cent by weight. This fourth stage treatment is continued, if necessary, until the oil concentration of the miscella is raised to 6.7 per cent by weight. After final separation of the latter miscella from the corn germ meal, the meal is similarly contacted in a fifth stage treatment with 4.8 pounds of fresh trichlorethylene, and this fifth stage treatment is continued, if necessary, until a miscella having an oil concentration of 2.7 per cent by weight is obtained.

As above pointed out, the above-mentioned fresh meal fed to the process contained 1.2 pounds of oil. In this illustrative example, the meal after the first stage treatment contains 1.7 pounds of oil, and also contains 3.6 pounds of trichlorethylene. The meal after the second stage treatment contains .9 pound of oil and 3.2 pounds of trichlorethylene. The meal after the third stage treatment contains .44 pound of oil and 3.0 pounds of trichlorethylene. The meal after the fourth stage treatment contains .19 pound of oil and 2.6 pounds of trichlorethylene. The final exhausted meal from the fifth stage treatment contains only 0.06 pound of oil, and 2.4 pounds of trichlorethylene.

The foregoing illustrative extraction is the result of feeding 10 pounds of fresh meal to the first stage, 4.8 pounds of fresh trichlorethylene to the fifth stage, and advancing by one stage each of the respective miscellae of a similar previous extraction, with the miscella from the first stage of said previous extraction going to solvent recovery. Of the 4.8 pounds of fresh trichlorethylene fed to the fifth stage, the equivalent of 2.4 pounds of this trichlorethylene is left in the spent meal, leaving 2.4 pounds of trichlorethylene (neglecting unavoidable losses) which trichlorethylene finally leaves the system in the highest concentrated miscella as the result of the fourth subsequent extraction. Thus the solvent to oil ratio is 2.4 to 1.2 by weight, or substantially 2:1 by weight. The volume ratio of solvent to oil is approximately 1.26 to 1.

The following example illustrates the use of vacuum filtration.

*Example V*

10 pounds of corn germ meal are treated in a seven-stage extraction with normal hexane as follows. The corn germ meal is disposed in a bed in a vacuum filter, and is sprayed with 5 pounds of miscella having a concentration of 37 per cent oil by weight in normal hexane, said miscella being that obtained in the second stage treatment of a previous similar extraction of corn germ meal from the same source. The original corn germ meal contained 13 per cent by weight, i. e. 1.3 pounds of oil. A vacuum of 500 mm. of mercury is applied to the underside of the bed of meal on the filter and the miscella sucked through. The treatment in this first stage yields a miscella having a concentration of 50 per cent by weight of oil. After final separation of this concentrated miscella from the corn germ meal, the meal is similarly contacted under vacuum in a second stage treatment with 4.6 pounds of miscella, this miscella being that obtained from the third stage treatment of said previous extraction, and having an oil concentration of 26.3 per cent by weight. This second stage treatment yields a miscella having a concentration of 37 per cent by weight of oil. After final separation of the latter miscella from the corn germ meal, the meal is similarly contacted under vacuum in a third stage treatment with 4.3 pounds of miscella, this miscella being that obtained from the fourth stage treatment of said previous extraction, and having an oil concentration of 17.5 per cent by weight. This third stage treatment yields a miscella having an oil concentration of 26.3 per cent by weight. After final separation of the latter miscella from the corn germ meal, the meal is similarly contacted under vacuum in a fourth stage treatment with 4.2 pounds of miscella, this miscella being that obtained from the fifth stage treatment of said previous extraction and having an oil concentration of 10.8 per cent by weight. This fourth stage treatment yields a miscella having an oil concentration of 17.5 per cent by weight. After final separation of the latter miscella from the corn germ meal, the meal is similarly contacted under vacuum in a fifth stage treatment with 4.0 pounds of miscella, this miscella being that obtained from the sixth stage treatment of said previous extraction and having an oil concentration of 5.7 per cent by weight. This fifth stage treatment yields a miscella having an oil concentration of 10.8 per cent by weight. After final separation of the latter miscella from the corn germ meal, the meal is similarly contacted under vacuum in a sixth stage treatment with 3.9 pounds of miscella, this miscella being that obtained from the seventh stage treatment of said previous extraction, and having an oil concentration of 2 per cent by weight. This sixth stage treatment yields a miscella having an oil concentration of 5.7 per cent by weight. After final separation of the latter miscella from the corn germ meal, the meal is similarly contacted under vacuum in a seventh stage with 3.9 pounds of fresh normal hexane. This seventh stage treatment yields a miscella having an oil concentration of 2 per cent by weight. The final exhausted meal from the seventh stage treatment contains only 0.085 pound of oil, and 2.62 pounds of hexane.

The foregoing illustrative extraction is the result of feeding 10 pounds of fresh meal to the first stage, 3.9 pounds of fresh normal hexane to the seventh stage, and advancing by one stage each of the respective miscellae of a similar previous extraction, with the miscella from the first stage of said previous extraction going to solvent recovery. Of the 3.9 pounds of fresh hexane fed to the seventh stage, the equivalent of 2.62 pounds of this hexane is left in the spent meal, leaving 1.28 pounds of hexane (neglecting unavoidable losses) which hexane finally leaves the system in the highest concentrated miscella as the result of the sixth subsequent extraction. Thus the solvent to oil ratio is 1.28 to 1.3 by weight, or substantially 1:1 by weight. The volume ratio of solvent to oil is approximately 1.36 to 1.

It will be understood that the foregoing examples are based upon particular operation conditions, and particular batches of meal from particular sources, and generally illustrate the practice of the invention. The extraction of solids from various sources under various conditions merely requires, on the part of the operator, a determination of the per cent of solvent holdup of the particular solids under the particular employed conditions of separation of exhausted solids in the last stage of the process, or under simulated conditions, so that a solvent to solute ratio by volume of not greatly exceeding 1.5 to 1 may be chosen, which ratio, as above pointed out, excludes that solvent which is retained by the exhausted meal after separation of miscella therefrom. To obtain final miscella of at least 40 per cent solute content by volume, it is merely necessary to choose at least the minimum requisite number of stages of treatment for this purpose, all of which will be well understood by persons skilled in the art upon becoming familiar herewith.

The expression "solids" when herein employed includes pulps.

The nature of the invention and how it may be carried out in practice will be further illustrated by way of example with reference to the accompanying flow-sheet, which illustrates by way of example the lay-outs of a plant in accordance with the invention. It should be understood that the invention is not limited to the examples given.

Referring to the flow-sheet, solid material capable of extraction is contained in the storage bin or hopper 1. Material requiring comminution, such as beans, kernels or nuts, is passed from the storage bin 1 by way of the duct 2 to cracking rollers 3, which reduce it to a suitable size. If the solid material is already in a form suitable for extraction, as in the case of certain meals, it is passed through by-pass 4 to pipe 5 leading direct to the extraction units. The comminuted material from the cracking rollers 3 is in view of the flexibility of the present new process with regard to the initial material, usually directly suitable for centrifugal solvent extraction in accordance with the present invention and is therefore passed through duct 6 to pipe 5 leading to the extraction unit. Where necessary, suitable units for pretreatment of the material from rollers 3 may be provided, as for example, a dehulling unit, a conditioner and flaking rollers, not shown on the flow sheet. The solid material to be extracted passes from pipe 5 into the loading device 7, from which it passes into the basket of the centrifugal solvent extractor 8, which latter is preferably constructed gas-tight to avoid loss of solvent. Fresh solvent is contained in the solvent tank 9, whereas concentrated miscella is contained in tank 10. The tanks 10, 10a, 10b and 10c contain miscella in decreasing order of concentration, from which the various miscellae can be taken off by the pipes 11, 11a, 11b and 11c respectively, which are controlled by the respective valves 13, 13a, 13b and 13c, to the solvent injector in the centrifugal extractor 8, which injector usually has the form of a spray.

In starting the operation concentrated miscella from tank 10 is passed through pipe 11 and valve 13, which is now open, while valves 13a etc. are kept closed, to the solvent injector in the extractor 8, where it passes through the solid in the basket, and extracts extractable matter, e. g. oil therefrom.

Any centrifugal force suitable to the circumstances may be employed. Good results have, for example, been obtained with centrifugal forces between about 600 g. and 1500 g.

The miscella thus obtained passes from the centrifuge through pipe 15, and is pumped by means of pump 16 and pipe 17 to the manifold 18, from which the valve controlled connections 19, 19a, 19b, 19c and 20 lead to the tanks 10, 10a, 10b, 10c and 9, respectively. At this stage the valve connection 19 is open whereas the valve controlled connections 19a to 20 are closed.

When the requisite amount of concentrated miscella has been circulated through the centrifuge until further extraction at this concentration is no longer considered economical, valves 13 and 19 are closed, and valves 13a and 19a are opened, thus admitting a miscella of lesser concentration from tank 10a to the centrifuge 8 and the circulating system.

This is repeated by successively circulating miscellae of lesser concentration through the solid undergoing extraction in centrifuge 8, until finally clean solvent from tank 9 is circulated via pipe 12, valve 14, centrifuge 8, line 15, pump 16, pipe 17, manifold 18 and valve-controlled connection 20.

Finally valve 14 is closed and the centrifuge run until miscella is expelled as far as possible, usually down to a content of 10 per cent, or even 5 per cent, or less.

With solvents of lower density, e. g. n-hexane, the solvent to oil weight ratio (ratio by weight of solvent to oil content of feed solids) employed is usually 1:1 or less. With solvents of higher density, e. g. trichlorethylene, the solvent to oil weight ratio employed is usually somewhat higher, e. g. 2:1. However, in any case, the solvent to solute ratio by volume is not substantially greater than 1.5:1, and is usually less, e. g. 1.4:1, or less.

The control of the valves may be automatic.

The miscella in tank 10 is now so concentrated, that it is passed direct by way of pipe 23 to the evaporator-stripping towers.

Extracted meal is removed from the centrifuge basket by a knife or other suitable means and passed via duct 24 into the extracted meal bin 25, and thence for the recovery of the solvent contained therein, by duct 26 to the meal drier 27, which may be of any suitable construction and operation. For example, meal drier 27 may be steam jacketed, and live steam may be injected through pipe 28, for passage through the drier 27 counter-currently to the meal, which is conveyed therethrough by screw-conveyors 29, and finally discharged at 29a.

Solvent vapors and steam issue from the driers at 30 and 31, and are passed through pipe 32 to the condenser 33, whence the condensed liquids are passed through pipe 34 into the water and solvent separation tank 35, wherein water and solvent are separated by layer formation. Thence the recovered solvent may be fed to fresh solvent tank 9 by means of pump 36, and pipe 22.

Any other means of solvent separation may be employed, such as, distillation, particularly when the solvent has an appreciable solubility in water.

As shown, concentrated miscella is passed by means of pipe 23 into the top of the falling film evaporator tower 37 in which it is passed in counter-current to live steam introduced at the bottom of the tower from pipe 38. The miscella issuing from the bottom of tower 37 is passed by pipe 39 to the top of the vacuum stripping column 40 into the bottom of which live steam is introduced from pipe 41. The bottom of column 40 may be steam-jacketed.

The extract, e. g. oil, which has thus been completely freed from solvent is withdrawn from the bottom of the column 40 to storage through pipe 43.

Solvent vapor and steam are withdrawn from the top of columns 37 and 40 through pipes 44 and 45, respectively, into pipe 46 to condenser 47. The vacuum producing equipment is indicated at 48 and may be of the steam jet or other type. The solvent and water thus condensed are passed by way of pipe 49 to the water and solvent separation tank 35. As previously pointed out, any other means for the separation of water and solvent, such as distillation, may be employed. Likewise, any other means for the recovery of solvent from the miscella and/or from the meal may be employed without departing from the spirit of the invention.

Heat exchange and other equipment may be installed in the solvent recovery plant, as required or desired.

After the draining of miscella from tank 10, the miscella in tank 10a is transferred to tank 10, such as by a pump (not shown). This is followed by the transfer of the miscella in tank 10b to tank 10a, then by the transfer of the miscella in tank 10c to tank 10b, and then by the transfer of the miscella in tank 9 to tank 10c, such as by suitable pumps (not shown). Fresh solvent is then introduced from supply pipe 21 and/or pipe 22 into tank 9. A fresh charge of solid material to be extracted is placed in centrifuge 8, whereupon the above-described cycle of operations is repeated.

Alternatively, after the draining of miscella from tank 10, and the placing of a fresh charge of solid material to be extracted in the centrifuge 8, the miscella in tank 10a is passed to tank 10 through centrifuge 8 by opening valves 13a and 19, whereupon if it is desired to continue the extraction at this stage, valve 13a is closed and valve 13 opened so that the miscella in tank 10 may be passed as many times as desired through the charge in the revolving centrifuge 8 and back to tank 10 in the manner already described.

After the extraction at this stage is carried on to the extent desired, valves 13 and 19 are closed, and valves 13b and 19a are opened, whereupon the miscella in tank 10b is passed through centrifuge 8 to tank 10a. When this has been completed valve 13b is closed, and if it is desired to continue the extraction at this stage, valve 13a is opened, and the miscella now in tank 10a is passed as many times as desired through centrifuge 8, and back to tank 10a, in the manner already described.

After the extraction at this latter stage is carried on to the extent desired, valves 13a and 19a are closed, and valves 13c and 19b are opened, so as to pass the miscella from tank 10c to tank 10b via centrifuge 8, and the charge contained therein. When this has been completed valve 13c is closed, and if it is desired to continue the extraction at this stage, valve 13b is opened, and the miscella now in tank 10b is passed as many times as desired through centrifuge 8, and back to tank 10b, in the manner already described.

After the extraction at this latter stage is carried on to the extent desired, valves 13b and 19b are closed, and valves 14 and 19c are opened, whereupon the miscella in tank 9 is passed to tank 10c through centrifuge 8. When this transfer of miscella has been completed valve 14 is closed, and if desired, extraction at this stage may be continued by opening valve 13c, so as to pass as many times as desired the miscella now in tank 10c through centrifuge 8, and back to tank 10c in the manner already described.

When extraction at this latter stage has been carried on to the extent desired, valves 13c and 19c are closed, and fresh solvent is charged to tank 9 such as from solvent supply line 21. Valves 14 and 20 are now opened to effect the last stage of the extraction, by passing as many times as desired the solvent in tank 9 through centrifuge 8, and back to tank 9 to produce miscella of the lowest concentration in the process.

After this has been completed, the miscella is drained from tank 10, and passed to solvent recovery as already described. Likewise the exhausted charge in centrifuge 8 is removed, and passed to solvent recovery as already described.

Thereupon, with the placing of a fresh charge in centrifuge 8, the above cycle of operations are repeated.

Obviously, any other cycle of operations accomplishing my purpose may be employed without departing from the spirit of the invention.

Likewise, any other number of stages of extraction may be employed, such as 2, 3, 4, 6, 7, 8 or more, as desired, without departing from the spirit of the invention.

While I have particularly described my invention, for purposes of illustration, in connection with a single centrifuge, it will be obvious to persons skilled in the art that any desired number of centrifuges may be employed following the principle of successively extracting with miscella of progressively decreasing oil concentration, and with ratios of solvent to solute concentration in the original charge as described, and whether any individual charge of solids remains in a single centrifuge throughout the extraction, or progresses from centrifuge to centrifuge in any desired manner during the extraction, or otherwise. However, I prefer to operate in a manner such that any original charge of solids to a centrifuge remains in that centrifuge throughout the extraction.

While hereinabove I have referred to mixing the solid to be extracted with solvent for transport into the centrifuge, e. g. in the form of a pumpable slurry, I prefer, when following the principle of successively extracting with miscella of progressively decreasing oil concentration (and finally with fresh solvent), to transport the fresh charge of solid to be extracted into the centrifuge in the form of a mixture (e. g. a slurry) with miscella of highest oil content produced in practicing the process.

Thus miscella from tank 10 may be used for this purpose, prior to passing it to the evaporator-stripping towers, or to other solvent recovery processing, provided that its volume is permitted to build up in tank 10 as the result of successive extractions in order to provide sufficient liquid for this purpose. The miscella is then separated from the charged mass by centrifuging, and may be returned to tank 10 by opening valve 19. A portion only of the contents of tank 10, e. g. equivalent in volume to the final miscella produced during a single extraction, may then be sent to solvent recovery as above described, in order to maintain in tank 10 sufficient liquid for subsequent slurrying purposes. On the other hand and if desired, this portion may be withdrawn from tank 10 prior to such slurrying procedure, provided sufficient miscella is left in tank 10 to accomplish the desired purpose. It will be understood that the miscella employed for slurrying purposes may be kept in a tank separate from tank 10 and returned thereto upon separation from the charged mass, in which case, if desired, the final miscella from tank 10 may be transferred to such separate tank, and the portion of concentrated miscella going to solvent recovery may be removed from such separate tank. Any other procedure may be adopted without departing from the spirit of the invention.

Tanks 10, 10a, 10b, 10c and 9, or their equivalent and irrespective of number, may be of any desired or convenient size. The miscella of the respective concentration present in any particular tank may be of any desired quantity, e. g. the quantity advanced to the particular tank during or subsequent to extraction with miscella of next lower concentration, or more. In any event, the final miscella which is produced by the extraction and which is withdrawn from tank 10, or its equivalent, should be of at least the minimum solute content set forth herein to obtain the benefits of observing a relatively low ratio of fresh solvent to the solute content of the original solids charged to centrifuge 8, as defined herein, and this same principle is preferably observed in charging fresh solvent to tank 9, or its equivalent, and in advancing miscella from stage to stage in the series.

In other words, the miscella in any one or more of the respective tanks may be permitted to build up somewhat from previous extractions, if desired for any reason, and likewise miscella of the respective concentration may be added to any one or more of these tanks, without departing from the spirit of the invention. For example, tank 10 may contain a reserve of miscella to be used for slurrying purposes in charging solids to be extracted to the centrifuge 8, since liquid considerably in excess of that produced by a single extraction is required for this purpose.

A number of centrifuge solvent extractors may be combined in a battery.

The term "particles" as used in the claims is intended to include whole seeds, pulverized, flaked or comminuted seeds, disintegrated or comminuted fish, whale, or other oil-containing solids of the animal or marine class, or other solids (including pulps) containing solvent-extractable oil, fat and/or wax; to which this invention in its generic sense is applicable for the solvent extraction of such oil, fat and/or wax.

Also, for convenience, the term "miscella" as used in the claims is intended to include fresh solvent, as well as solvent having oil, fat and/or wax in solution.

It is to be understood that the above particular description is by way of illustration, and that changes, omissions, additions, substitutions and/or modifications may be made without departing from the spirit of the invention. Accordingly it is intended that the patent shall cover, by suitable expression in the claims, whatever features of patentable novelty reside in the invention.

This application is a continuation-in-part of my copending application Serial No. 127,233, filed November 8, 1949.

I claim:

1. A process for the solvent extraction of one of the group consisting of oil, fat and wax from particles of solid matter of biological origin, characterized in that the solvent to solute ratio by volume, excluding from such ratio that solvent which is retained by the particles of solid matter upon separation of miscella therefrom, is maintained sufficiently low as not to be in excess of approximately 1.5 to 1 to produce a miscella of at least approximately 40 per cent solute content by volume.

2. The process of claim 1, characterized in that the solid matter is subjected to extraction in step-wise manner with miscella of progressively decreasing solute content.

3. The process of claim 2, characterized in that the solid matter is maintained in a bed through which the miscella is passed.

4. The process of claim 3, characterized in that the bed is disposed in a revolving centrifuge basket to assist in passing the miscella through said bed, and to assist in separating said miscella from said bed.

5. The process of claim 3, characterized in that the solid matter is oil-containing vegetable matter.

6. The process of claim 5, characterized in that the particles of solid matter are first contacted with a miscella of such concentration that there is substantially no reduction in the oil content of the solid matter as a result of said contact.

7. The process of claim 5, characterized in that the vegetable matter is flaked.

8. The process of claim 5, characterized in that the vegetable matter is selected from the group consisting of cotton seed, soya bean, linseed, sunflower seed, peanut, corn germ, and sesame seed.

9. The process of claim 3, characterized in that the solid matter is selected from oil-bearing marine life.

10. The process of claim 3, characterized in that the solid matter is transported to the bed in the form of a slurry with miscella of at least approximately 40 per cent solute content by volume.

11. The process of claim 10, characterized in that the bed is formed from the slurry in a revolving centrifuge.

12. The process of claim 1, characterized in that the solvent to solute ratio by volume as defined is maintained sufficiently low as not to exceed approximately 1:4 to 1.

13. The process of claim 1, characterized in that the solvent employed is hexane.

14. The process of claim 1, characterized in that fibrous material is admixed with the material to be extracted.

15. The process of claim 1, characterized in that the solvent is passed in closed circulation through the solid matter.

References Cited in the file of this patent
UNITED STATES PATENTS

| Number | Name | Date |
|---|---|---|
| 427,410 | Forbes | May 6, 1890 |
| 1,199,861 | Barstow et al. | Oct. 3, 1916 |
| 1,238,084 | Barstow et al. | Aug. 28, 1917 |
| 1,865,615 | Coleman | July 5, 1932 |
| 1,921,446 | Andrews et al. | Aug. 8, 1933 |
| 2,467,404 | Pascal | Apr. 19, 1949 |
| 2,505,749 | Beckel et al. | May 2, 1950 |
| 2,524,037 | Beckel et al. | Oct. 3, 1950 |
| 2,524,678 | Olcott | Oct. 3, 1950 |